United States Patent [19]

Corbett et al.

[11] 4,454,086
[45] Jun. 12, 1984

[54] MAKING CROSS-LINKED STYRENE POLYMER FOAM

[75] Inventors: John M. Corbett, Newark, Ohio; Charles R. Bearden, Midland, Mich.

[73] Assignee: The Dow Chemical Company, Midland, Mich.

[21] Appl. No.: 389,836

[22] Filed: Jun. 18, 1982

[51] Int. Cl.$^3$ ............................................. B29D 27/00
[52] U.S. Cl. .................................. 264/53; 264/176 R; 264/211; 264/378.1; 264/DIG. 18; 264/DIG. 83; 521/79; 521/147
[58] Field of Search ................. 264/54, DIG. 18, 53, 264/DIG. 83, 176 R, 211, 328.1; 521/79, 147

[56] References Cited

U.S. PATENT DOCUMENTS

| | | | |
|---|---|---|---|
| 3,651,183 | 3/1972 | Hosoda et al. | 264/DIG. 18 |
| 3,960,784 | 6/1976 | Rubens | 264/DIG. 18 |
| 4,020,025 | 4/1977 | Zeitler et al. | 264/DIG. 18 |
| 4,108,934 | 8/1978 | Rubens et al. | 264/DIG. 18 |
| 4,155,965 | 5/1979 | Allada | 264/DIG. 18 |

*Primary Examiner*—Philip E. Anderson
*Attorney, Agent, or Firm*—R. B. Ingraham

[57] ABSTRACT

High quality plastic foam and the like expanded products and articles are made by incorporating a blowing agent in an acid-containing alkenyl aromatic polymer, such as a copolymer of styrene and acrylic acid; extruding while cross-linking the polymer with a polyfunctional cross-linking agent.

19 Claims, 4 Drawing Figures

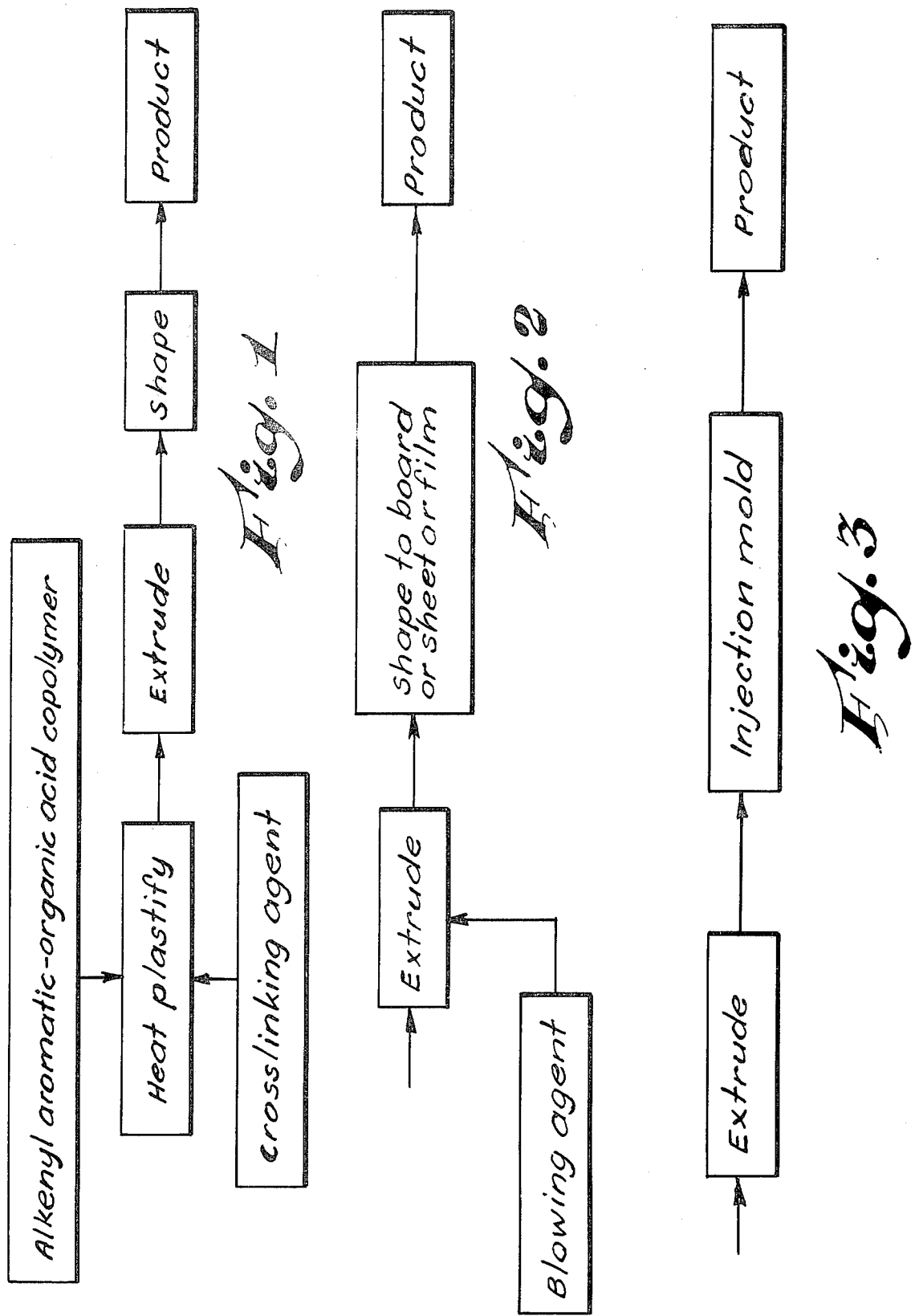

MAKING CROSS-LINKED STYRENE POLYMER FOAM

It is known that the use of relatively lightly to moderately cross-linked resinous polymeric materials generally improved foamed or expanded plastic products and materials. Prior art and conventionally utilized practice does not ordinarily attempt to accomplish the cross-linking during normal thermoplastic fabrication processing procedures, as in the course of normal extrusion operations and the like. Cross-linked polymers are not usually employed for processing in conventional extrusion or injection molding apparatus because of shear degradation of the polymer.

The prior art does not appear to concern itself with the production by in-process cross-linking techniques using conventional extruders and injection molding machines to provide articles foamed or solid of improved physical properties.

The present invention concerns production of high quality, cross-linked foamed and unfoamed articles of various acid-containing alkenyl aromatic copolymers using conventional apparatus such as typical extruders and injection molding machines.

The present invention is particularly suited for the preparation thereof extruded foam boardstock and the like for insulation and other applications, extruded foam and unfoamed sheet and film for packaging, decorative and other uses; for packaging, cushioning, injection molded parts, and the like.

Method for the preparation of synthetic resinous thermoplastic products which comprises providing an acid-containing resinous polymer of an alkenyl aromatic monomer having copolymerized therewith at least about 60 percent by weight of at least one monomer of the Formula:

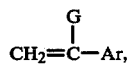

$$CH_2=\underset{\underset{Ar,}{|}}{\overset{G}{C}}\quad\text{(I)}$$

wherein G is selected from the group consisting of hydrogen and methyl and Ar is an aromatic radical, including various alkyl- and halo-ring-substituted aromatic units, of from 6 to about 10 carbon atoms; with acid-providing monomer that is copolymerizable with styrene of at least one other monomer of the Formula:

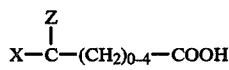

$$X-\underset{\underset{}{|}}{\overset{Z}{C}}-(CH_2)_{0-4}-COOH\quad\text{(II)}$$

wherein Z is selected from the group consisting of hydrogen, alkyl radicals that contain not more than about 4 carbon atoms and carboxyl units when X is devoid of any carboxylating attachments; and X is a monoethylenically unsaturated substituent selected from the group consisting of methylene, alkenyl units containing from 2 to about 5 carbon atoms and, when Z is not carboxyl, carboxylated methylene and monocarboxylated alkenyl and alkene units containing from 2 to about 5 carbon atoms; the same having any further balance, if any, of copolymerized ethylenically unsaturated components, monomers and elastomeric natural or synthetic rubbers of at least one member of the class of same that are copolymerizable with styrene; feeding and passing through a mixing, malaxating extrusion apparatus acid-containing polymer, operating the extrusion apparatus at a temperature of between about that of the heat softening temperature of said polymer and that of the decomposition temperature of the polymer; and at one or more points within the apparatus at about or between its feed point and the point of extrudate discharge therefrom, incorporating into said polymer mass passing through said apparatus an effective interconnecting and network-building additament quantity of a cross-linking agent that is reactive with the free carboxyl entities in said polymer whereby to cross-link said mass of polymerizate material therein; and finally discharging said cross-linked mass of polymer material from said extruder apparatus.

Products having exceptionally good quality, are thus directly obtained from the extrusion apparatus either in the form of desired extrudate (such as sheet, film or shaped article, and injection molded articles). The melt strength inherent in the cross-linked, thermoplastic materials prepared in practice of the present invention is valuable for obtaining foam, films and other expanded plastic products. Consistently reproducable results are obtained. No important adjustments or changes in use of the apparatus and processing procedures are required.

BRIEF DESCRIPTION OF THE DRAWINGS

FIG. 1 is a schematic flow sheet of the process in accordance with the invention.

FIGS. 2 and 3 indicate modifications of the process depicted in FIG. 1.

Figure 4:
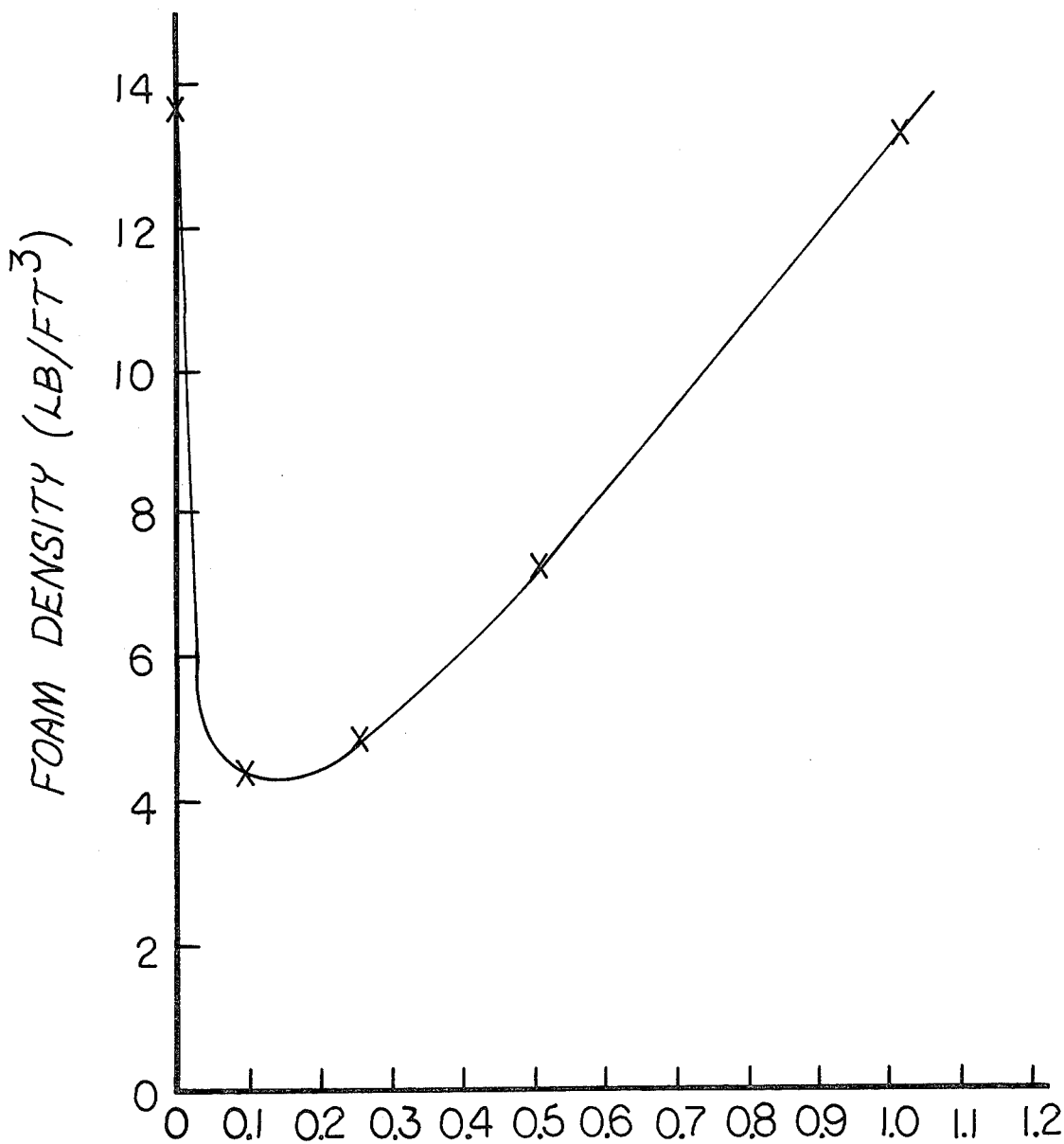
FIG. 4 is a plot of foam density versus the theoretical amount of acrylic acid reacted.

The acid-containing copolymers in practice of the present invention are alkenyl aromatic copolymers containing, polymerized therein at least about 60 weight percent based on polymer composition weight, of at least one monomer of the Formula:

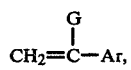

$$CH_2=\underset{\underset{Ar,}{|}}{\overset{G}{C}}\quad\text{(I)}$$

wherein G is selected from the group consisting of hydrogen and methyl and Ar is an aromatic radical including alkyl- and halo-ring-substituted aromatic radicals of from 6 to about 10 carbon atoms, such as α-methylstyrene; vinyl toluene; vinyl naphthalene; the dimethyl styrenes; t-butyl styrene; chlorostyrenes; bromostyrenes; isopropenyl toluene; and mixtures thereof.

It is usually more advantageous, for the acid-containing polymer to contain at least about 80 to up to as much as 99.9 weight percent of the Formula (I) monomer polymerized therein.

The acid-containing polymer may be a terpolymer or even more complex copolymer formed with the acidic monomer and the alkenyl aromatic Formula (I) monomer with an other than Formula (I) or Formula (II) monomer or other unsaturated polymerizable component that is copolymerizable therewith.

Copolymers may include those prepared by addition polymerization of the Formulae (I) and (II) monomers with such other monomers as: methyl acrylate; ethyl acrylate; methyl methacrylate; acrylonitrile; α-methacrylonitrile; methacrylamide; vinylpyridines, such as 2-vinylpyridine and 2-methyl-5-vinylpyridine; methyl vinyl ketone and methyl isopropenyl ketone; vinyl halides; particularly vinyl chloride; various vinyl organic acid esters, such as vinyl acetate, vinyl propionate; maleic anhydride; and so forth.

The acid-containing alkenyl aromatic polymers may also be ter-, tetra- and the like copolymers of monomers with natural and/or synthetic rubber or elastomers in order to provide rubber-modified and impact-resistant products.

The acid-providing comonomers that are copolymerized with the Formula (I) monomers and if desired other copolymerizable monomers to provide the acid-containing, cross-linkable, alkenyl aromatic polymers employed in practice of the present invention are generally any of the acrylic acids, such as acrylic acid and methacrylic acid, as well as monoethylenically unsaturated, dibasic carboxylic acids, such as fumaric acid, maleic acid, itaconic acid, citraconic acid, mesaconic acid, and the like, having the general Formula:

  (II)

wherein Z is selected from the group consisting of hydrogen alkyl radicals that contain not more than about 4 carbon atoms and carboxyl units when X is devoid of any carboxylating attachments and X is a monoethylenically unsaturated substituent selected from the group consisting of methylene, alkene, and alkenyl units containing from 2 to about 5 carbon atoms (including vinyl, isopropenyl and other alkyl-substituted arrangements) and, when Z is not carboxyl, carboxylated methylene, and monocarboxylated alkenyl units containing from 2 to about 5 carbon atoms.

In the event a foamed or foamable product is desired, volatile organic, gas- or vapor-providing blowing agent may be used in conventional admixture with the normally solid acid-containing alkenyl aromatic copolymers for conversion of same into expanded articles. Gaseous materials, such as carbon dioxide, may be provided in the acid-containing thermoplastic in the known ways. The incorporation of the blowing agent in the plastic mass can be accomplished in any suitable way as by incorporation in a melt to be extruded into expandable particles; mixing of the blowing agent with extrusion-grade powders, granules, beads or other particulate form of the plastic to be rendered into expandable forms by means of extrusion procedures; impregnation of a gaseous or vaporized blowing agent into the extrudable particles to be used. Suitable blowing agent materials are monochloro-methane; dichloro-difluoromethane; trichloro-monofluoro-methane; trichloro-trifluoro-ethane; propanes; butanes; pentanes; and mixtures thereof.

The acid-containing, thermoplastic, alkenyl aromatic polymers used in practice of the present invention are subjected to reaction and modification with a suitable cross-linking agent for the compositions before feeding into, during passage through or just prior to emergence from a conventional screw extruder or the like apparatus and through suitable die or mold to produce the shaped articles obtainable by the present invention.

In the cross-linking step of the present invention, temperatures tend to vary with given polymer systems being processed along with particular blowing agents and cross-linking agents employed and are generally in the range that falls between the foaming temperature of the system being processed and the decomposition temperature thereof. Optimum operating temperatures, of course, are either readily perceptible to those skilled in the art, or easily determinable.

Many commercially or otherwise readily available polyfunctional materials that are reactive with non-hindered carboxyl units in acid-containing polymeric structures can be employed to get excellent results in and for the cross-linking and network structure formation of the acid-containing alkenyl aromatic polymers involved in present invention.

Without limitation thereto, however, it is frequently most attractive and conducive of dependably statisfactory results to use, as the cross-linking agent for employment in practice of the invention, such commodities as the various epoxy resins, polyisocyanates, and/or divinyl ether type products, or mixtures of one or more thereof.

Illustrative of these:

(i) Satisfactory epoxy resins include such commercially-available materials as "D.E.N.-431", "D.E.N.-439", "D.E.R.-331", "D.E.R.-542", "D.E.R.-661", "D.E.R.-642u", "D.E.R.-664" and "D.E.R.-667" (obtainable from The Dow Chemical Company) and their likes or equivalents, all of which are characterized by containment therein of the characteristic

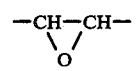  (C)

structure in its molecular arrangement. The epoxy resin cross-linking agents to employ advantageously have an epoxy equivalent weight value that is between about 50 and 2000, more advantageously in the range from about 100 to 1000 or so; and (ii) Satisfactory polyisocyanates typically include such commercial materials as "MONDUR MR", "MONDUR MRS" and "MONDUR MR-200" (produced by Mobay Chemical Company) and the "PAPI's" 580, 135 and 27 (manufactured by The Upjohn Company). These, chemically, are polymethylene polyphenylene polyisocyanates which, somewhat more specifically, is illustrated by 4,4'-methylenediphenyl-diisocyanate (i.e., "MDI"). Characteristically, such compounds have two or more isocyanate groups per molecule thereof.

(iii) Satisfactory divinyl ether type products to employ are typified by ethylene glycol divinyl ether. Nonetheless, they may also be any of the polyvinyl polyalkylene oxide vinyl ethers which may be represented by the generic Formula:

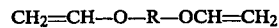  (D)

wherein R is a divalent alkyl group.

Optimum foaming behavior is frequently realized when the product of the acid-containing polymer constituent and the cross-linking agent utilized for the interconnecting reaction forms about one interlink per weight average molecule that is involved. Accordingly and in general, markedly improved thermocollapse behavior characteristics of the foam products manufactured in pursuance with practice of the present invention when the cross-linking coefficient (which represents the number of cross-links per weight average molecule) ranges between values of about 0.5 to about 3 and preferably from 0.8 to 2.

On the practical scale, the quantity of the cross-linking reagent to utilize is ordinarily somewhere in the range of between about 0.10 and about 10 milliequivalents thereof per each 100 parts of the acid-containing alkenyl aromatic polymer to be interconnected, all taken on a weight basis. This is particularly the case when the copolymers of styrene and acrylic acid are employed. Very often, the ratio of cross-linking reagent to polymer being treated falls within the more narrow limits of about 0.15 to about 7 milliequivalents of the former to 100 parts of the latter.

The catalyst materials, if employed, for the cross-linking reaction that occurs are usually inorganic and/or organic oxides and hydroxides of various metallic and organic constituents, although certain salts (including halides and organic acid products such as acetates and stearates) and organic azotic derivatives such as amines and imidizoles are also often useful. The inorganic oxides and hydroxides that exhibit the greatest functionality for the given purpose are quite often those of the alkali metals as well as those of the Groups IIA and IIB metals in the Periodic Table, plus certain salts including chlorides, acetates, stearates and the like of silicon, germanium, iron and its other Group VIII associates cobalt, nickel and chromium. Catalyst selection is frequently best determined by trial and error procedures. An abundance of art exists as to effective catalyzation of the reaction of any given cross-linking agent that is selected for reaction with the carboxyl groups in the acid-containing polymers. Effective quantities of catalyst to employ generally are between about 0.025 and about 2 percent by weight based on total composition weight involved; a more advantageous range oftentimes being from about 0.05 to about 1 percent by weight of catalyst material.

For maximized foam quality results, it is usual to employ a nucleating agent in the materials that are handled and made in practice of the present invention. This, of course, is consistent with general practices in the art concerned with more uniform cell size and characteristics in expanded cellular foam plastics products. Conventional quantities of finely divided material usually inorganic and inert to the materials in which they are incorporated, can thus be employed for the purpose. While nucleating agent loadings for given expandable systems may vary, something on the order of such (typically inorganic filler-type) substances, that is between about 0.001 and about 2 percent by weight, more often from about 0.1 to about 0.5 percent by weight, is ordinarily suitable. Talc makes a very good nucleating agent for most systems of interest. However, many other nucleating agent substances can be used, including titanium dioxide ($TiO_2$), chalk ($CaCO_3$), various oxides of lead including white lead, fumed silica and the like.

The compositions of the present invention can contain other additives that are often included in such compositions as antioxidants, pigments (other than substances utilized for nucleating agent purposes); dyes; fillers (either pulverulent, particulate or fibrous and, again, other than such classes of materials employed for nucleation); stabilizers; mineral oil plasticizers; and the like.

The polymers of the present invention can be fabricated into sheet, film, board, various molded forms and articles. Employing the present invention to prepare foams by extrusion or molding results in foam that resists collapse at temperatures which are significantly higher than the relative collapse temperature of foams from the unmodified parent thermoplastic polymer that is involved.

The following examples still further illustrate the invention. In these, all parts and percentages (unless otherwise indicated) are to be taken on the weight basis by which they were worked and all temperatures are in °C. For a good part of the data produced, a conventional variety of Brabender milling unit having a mixing chamber with associated means for heating and measuring the melt consistency by torque determinations on the incorporated material being tested was utilized; the model involved being known as a "Plastic-Corder" (Reg. TM) unit.

EXAMPLE 1

Cross-linking of Styrene/Acrylic Acid Copolymer with Diethyleneglycol Divinyl Ether During the Extrusion Process A copolymer of styrene and acrylic acid having a weight average molecular weight of about 215,000 and containing 8 percent by weight of acrylic acid was extruded into expandable beads containing approximately 14 parts per hundred of trichlorofluoromethane. The expandable granules were reextruded into foam on a laboratory ¾ inch diameter extruder. A foaming temperature (die temperature) of 175° C. was used. One percent talc was added as a nucleator. Diethyleneglycol divinyl ether was added at several different concentrations with the following results:

TABLE I

| Extruded Foam of Polystyrene/Acrylic Acid/Diethylene Glycol Divinyl Ether | | | | |
|---|---|---|---|---|
| Diethylene Glycol Divinyl Ether | | | | |
| Weight % | Milliequivalents/ 100 Parts Styrene/Acrylic Acid Polymer | Theoretical Equivalent Amount Acrylic Acid Reacted* | Foam Density | Comments |
| 0 | 0 | 0 | 13.6 lb/ft$^3$ | Foam Collapsed |
| 0.11 | 1.4 | 0.1 | 4.4 lb/ft$^3$ | Foamed Well |
| 0.27 | 3.4 | 0.25 | 4.8 lb/ft$^3$ | Foamed Well |
| 0.55 | 7.0 | 0.50 | 7.2 lb/ft$^3$ | Foamed Well |
| 1.10 | 13.9 | 1.00 | 13.1 lb/ft$^3$ | Excessive cross-linking. High density skin. |

*Weight percent of acrylic acid reacted based on total weight of SAA resin.

These data are shown graphically in the FIG. 4. At this high foaming temperature (175° C.) the control (no cross-linking) foamed and collapsed to high density due to insufficient melt tension. An optimum concentration of DEGDVE appears to be ~0.11 percent which corresponds theoretically to reaction with 0.10 percent acrylic acid in the copolymer.

EXAMPLE 2

Cross-linking of Styrene/Acrylic Acid Copolymer (SAA) with Epoxy Resin During the Extrusion Process The same styrene-acrylic acid resin described in Example 1 was extruded into foam using a 1¼ inch diameter extruder. Twelve parts per hundred of a 50/50 (by weight) mixture of methyl chloride and dichlorodifluoromethane was used as a blowing agent. One part per hundred talc was added as nucleator. Two tenths of one part (0.20) Dow Epoxy Novolac D.E.N.-431®, (a Dow Epoxy Novolac resin having an epoxy equivalent weight of ~175) and five-hundredths of one part (0.05) magnesium oxide catalyst per hundred parts of styrene-acrylic acid polymer were used. The 0.2 parts per 100 D.E.N.-431 is approximately 1.1 epoxy milliequivalents per 100 parts of styrene-acrylic acid copolymer. At a foaming temperature of 162° C. the following data in Table II was obtained.

TABLE II

Styrene-Acrylic Acid/D.E.N.-431

| | Styrene-Acrylic Acid (8% Acrylic Acid) Foam Control | Styrene-Acrylic Acid/D.E.N.-431 Foam |
|---|---|---|
| Relative die opening required to maintain adequate pressure | 1 | ~2.7 |
| Relative foam cross-section | 1 | ~3 |
| Gassing (loss of blowing agent at the die) | Yes | No |
| Solution viscosity of foam (10% solution in THF) | 14.3 cps | 27.6 cps |
| Melt Tension at 220° C. | ~3 g | ~12 g |

Foam samples of the styrene-acrylic acid foam control and the styrene-acrylic acid/D.E.N.-431 system were exposed to an elevated temperature of 138° C. for varying periods of time after which they were aged under ambient conditions for 24 hours prior to measuring foam densities. The results are presented in Table III.

TABLE III

Oven Stability Tests at 138° C.

| Oven Exposure Time | Styrene-Acrylic Acid Foam Control Samples Sample 1 | Sample 2 | Styrene-Acrylic Acid/D.E.N.-431 Foam |
|---|---|---|---|
| 0 minutes | 2.55 lb/ft³ | 1.70 lb³/ft | 1.86 lb/ft³ |
| 5 minutes | 1.67 lb/ft³ | 1.17 lb/ft³ | 1.07 lb/ft³ |
| 10 minutes | 1.41 lb/ft³ | — | 1.08 lb/ft³ |
| 30 minutes | 6.79 lb/ft³ | 5.57 lb/ft³ | 1.31 lb/ft³ |

Note:
These oven exposure data demonstrate improved resistance to thermal collapse of the styrene-acrylic acid/epoxy foam over the control samples.

EXAMPLE 3

Larger Scale Foam Extrusion Rate

The same styrene-acrylic acid copolymer described in Example 1 was extruded into foam using an epoxy resin as a cross-linking agent at a relative polymer feed rate 20 times that used in Example 2. The blowing agent consisted of a mixture of methyl chloride/dichlorodifluoromethane (50/50 by weight). A small amount of talc was used to control cell size. Dow Epoxy Novolac (D.E.N.-431 ®) was used as the cross-linking agent by dissolving in methylene chloride (50/50 by weight) to facilitate pumping into the extrusion system. It was observed during the course of these experiments that the light cross-linking allowed a significantly larger die opening to be utilized. Table IV compares the results of several experiments with and without the addition of epoxy resin.

TABLE IV

Foam Extrusion Results of Styrene-Acrylic Acid (8% Acrylic Acid) with D.E.N.-431 ®

| Sample | D.E.N.-431 (pph) | MgO (pph) | Talc (pph) | Blowing Agent[a] (pph) | Foaming Temp (°C.) | Foam Solution Viscosity[b] (cps) | Foam Density (lb/ft³) With Skins | w/o Skins |
|---|---|---|---|---|---|---|---|---|
| 1 | 0 | 0 | 0.10 | 12.5 | 145 | 14.5 | 1.80 | 1.70 |
| 2 | 0 | 0 | 0.10 | 12.5 | 149 | 14.4 | 1.60 | 1.48 |
| 3[c] | 0 | 0 | 0.10 | 12.5 | 155 | 14.5 | 1.45 | 1.34 |
| 4 | 0.120 | 0.05 | 0.25 | 12.5 | 146 | 29.6 | 1.78 | 1.70 |
| 5 | 0.120 | 0.05 | 0.25 | 12.5 | 150 | 28.2 | 1.62 | 1.56 |
| 6 | 0.125 | 0.05 | 0.25 | 14.5 | 154 | 29.5 | 1.43 | 1.37 |
| 7 | 0.125 | 0.05 | 0.25 | 14.5 | 157 | 29.5 | 1.33 | 1.29 |
| 8 | 0.125 | 0.05 | 0.25 | 14.5 | 160 | 29.5 | 1.30 | 1.23 |

| Sample | Average 3-Directional Compression Strength (psi; 6 weeks old) | Average 3-Directional Compression Modulus (psi; 6 weeks old) | Average 3-Directional Cell Size (mm) |
|---|---|---|---|
| 1 | 26.7 | 747 | 0.36 |
| 2 | 21.1 | 447 | 0.41 |
| 3[c] | 19.3 | 352 | 0.40 |
| 4 | 28.8 | 746 | 0.36 |
| 5 | 25.5 | 670 | 0.30 |
| 6 | 24.1 | 506 | 0.32 |
| 7 | 20.4 | 422 | 0.38 |
| 8 | 19.0 | 387 | 0.39 |

[a]50/50 by weight mixture of methyl chloride and dichlorodifluoromethane.
[b]10% solution in tetrahydrofuran at 25° C.
[c]This sample was not of satisfactory quality due to borderline stability. It could not be formed satisfactorily.

EXAMPLE 4

Brabender Torque Data as a Measure of Cross-linking Reactions

A. SAA (8% AA)/Diethyleneglycol Divinyl Ether Postulated Chemistry

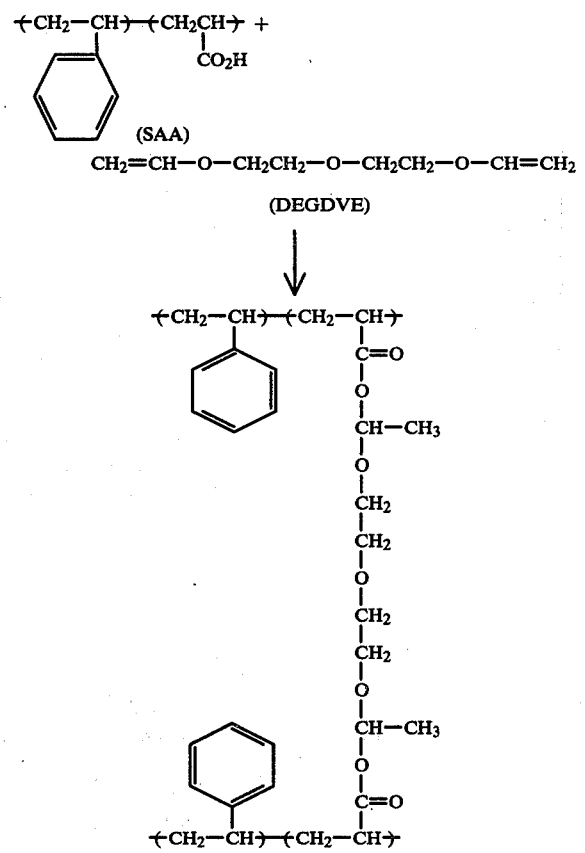

A copolymer of styrene and acrylic acid which contained about 8 weight percent acrylic acid was added to the mixing head of the Brabender Plasticorder ® which was preheated to 225° C. and rotating at 20 rpm. Addition of diethylene glycol divinyl ether caused immediate torque increase, indicating reaction between the styrene acrylic acid polymer and the diethylene glycol divinyl ether. For example, the addition of 1.1 percent diethylene glycol divinyl ether caused an immediate torque increase from 400 meter-grams to 1000 meter-grams, increasing further to 1500 meter-grams after 15 minutes and to 2200 meter-grams after 25 minutes. Further mixing caused a reduction in torque to 900 meter-grams after a total of 60 minutes, presumably due to shear degradation. Similar reaction studies were performed with 0, 0.11 percent and 0.27 percent diethylene glycol divinyl ether (DEGDVE). Melt flow data were obtained on these samples at three different temperatures after the one hour mixing on the Brabender and is set forth in Table V.

TABLE V

Melt Flow of Styrene-Acrylic Acid (8% Acrylic Acid)/Diethylene Glycol Divinyl Ether Samples*

| Diethylene Glycol Divinyl Ether | | Theoretical Equivalent Amount of Acrylic Acid Reacted** | Melt Flow (g/10 min) | | |
|---|---|---|---|---|---|
| Weight % | Milliequivalents/ 100 Parts Styrene-Acrylic Acid | | 175° C. | 200° C. | 225° C. |
| 0 | 0 | 0 | 0.4 | 10.9 | 64.5 |
| 0.11 | 1.4 | 0.1 | 0.3 | 9.2 | 44.0 |
| 0.27 | 3.4 | 0.25 | 0.3 | 8.5 | 26.1 |
| 1.10 | 13.9 | 1.00 | 0.3 | 7.1 | 20.8 |

*All samples were previously mixed for 60 minutes on the Brabender at 225° C. and 20 rpm. A 5 kg load was used for the melt flow studies.
**Weight percent of acrylic acid reacted based on total weight of SAA resin.
Note: These data corroborate the proposed cross-linking reaction.

B. SAA (8% AA)/D.E.N.-431 Postulated Chemistry

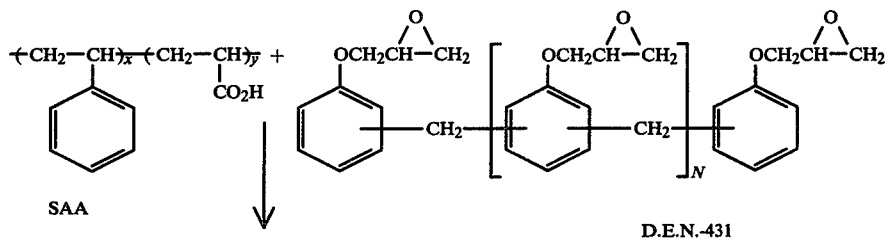

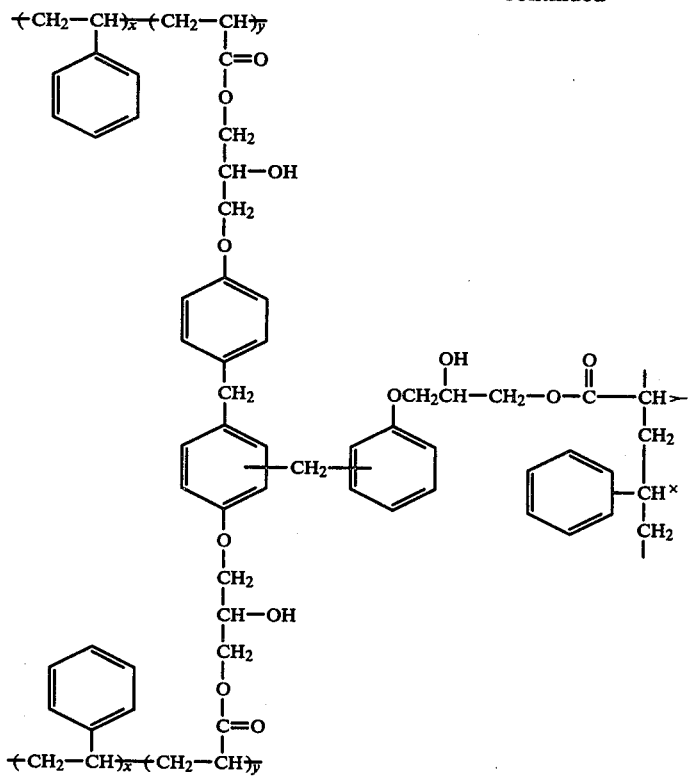

Styrene-acrylic acid (8 percent acrylic acid) was added to the Brabender mixer head preheated to 225° C. and rotating at 20 rpm. Catalyst magnesium oxide, when used, was added immediately thereafter. The D.E.N.-431 was added five minutes after the addition of the styrene-acrylic acid. Torque values were recorded relative to the value at four minutes (prior to the addition of epoxy). The results are set forth in Table VI.

TABLE VI

| MgO Concentration | D.E.N.-431 Concentration | Brabender Torque Data on Styrene-Acrylic Acid (8% Acrylic Acid)/D.E.N.-431 Relative Torque ($T/T_4$ min) | | | | | | | |
|---|---|---|---|---|---|---|---|---|---|
| | | 4 Minutes | 5 | 10 | 15 | 20 | 25 | 30 | 45 | 60 |
| 0 | 0 | 1 | 0.95 | 0.79 | 0.70 | 0.70 | 0.68 | 0.62 | 0.53 | 0.49 |
| 0.025 pph | 0 | 1 | 0.83 | 0.67 | — | 0.58 | — | — | 0.50 | 0.42 |
| 0 | 0.25 pph | 1 | 0.96 | 0.74 | 0.77 | 0.83 | 0.94 | 1.05 | 1.14 | 1.21 |
| 0.025 pph | 0.25 pph | 1 | 0.95 | 0.80 | 0.99 | 1.39 | 1.55 | 1.53 | 1.31 | 1.22 |

The significant relative torque development for the magnesium oxide/D.E.N.-431 system is indicative of cross-linking with the styrene-acrylic acid polymer. The decrease at long mixing times is probably associated with normal shear degradation.

C. Styrene/Acrylic Acid (15% AA) Diisocyanate Postulated Chemistry

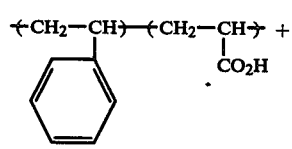

(SAA)

+

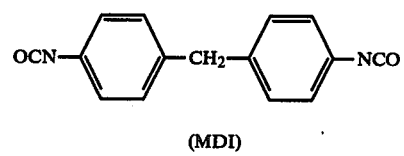

(MDI)

↓

-continued

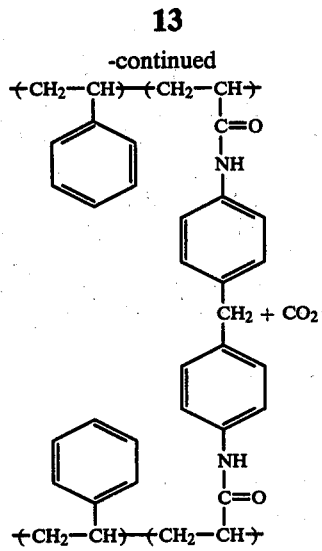
$+ CO_2$

A styrene-acrylic acid copolymer containing 15 percent acrylic acid polymerized therein was added to the Brabender mixing head which was preheated to 185° C. and rotating at 20 rpm. After leveling out, the initial torque reading was 2500 meter-grams. Three parts per hundred of 4,4'-methylenediphenyldiisocyanate (MDI) was added and the torque immediately increased to 3500 meter-grams, indicating cross-linking between the MDI and styrene-acrylic acid copolymer resin. Upon addition of three more parts per hundred of MDI, the torque increased to 4000 meter-grams and then more slowly to 5000 meter-grams. Further addition of 4.7 pph MDI resulted in immediate cross-linking to the extent of producing an infusible powder indicating excessive reaction. Total reaction time for this experiment was 5 minutes.

D. Styrene-Acrylic Acid Ionomer/D.E.N.-431 Postulated Chemistry

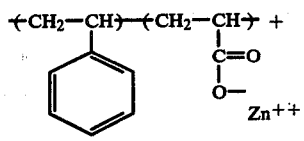

-continued

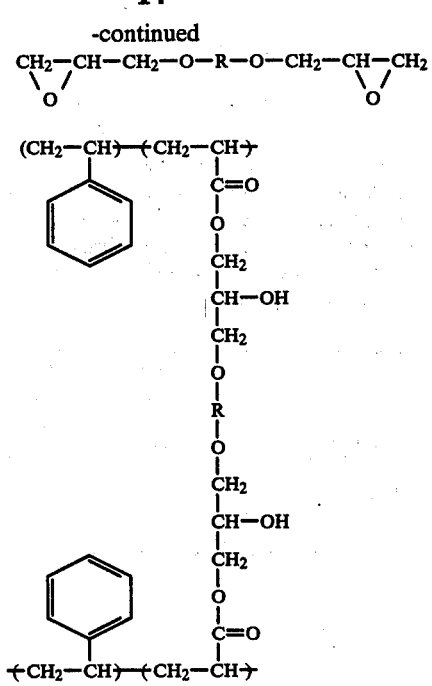

Styrene-acrylic acid copolymer with a low level of acrylic acid (0.16 percent) in the form of the zinc salt was added to the Brabender mixing head which was preheated to 225° C. and rotating at 20 rpm. After five minutes, 0.25 pph of D.E.N.-431 was added. Torque values, relative to four minutes are shown in Table VII.

TABLE VII

| Brabender Torque Data on Styrene-Acrylic Acid Zn Ionomer/D.E.N.-431 | | | | | | | | | |
|---|---|---|---|---|---|---|---|---|---|
| | Relative Torque (T/T$_4$ min) | | | | | | | | |
| | 4 Minutes | 5 | 10 | 15 | 20 | 25 | 30 | 45 | 60 |
| Styrene-Acrylic Acid-Zn Ionomer Control | 1 | 0.94 | 0.93 | 0.86 | 0.84 | 0.81 | 0.81 | 0.74 | 0.67 |
| Styrene-Acrylic Acid-Zn Ionomer + 0.25 pph D.E.N.-431 | 1 | 0.97 | 0.94 | 1.00 | 1.04 | 1.06 | 1.08 | 1.10 | 1.09 |

Note:
The torque development with the D.E.N.-431 indicated cross-linking with the styrene-acrylic acid copolymer ionomer.

E. Styrene-Acrylic Acid (1% Acrylic Acid)/D.E.N.-431

Styrene-acrylic acid copolymer containing 1 percent acrylic acid was added to the Brabender mixing head which was preheated to 225° C. and rotating at 20 rpm. Sodium hydroxide catalyst (0.20 pph) was added immediately and 0.25 pph D.E.N.-431 was added at five minutes. The relative torque values are shown in Table VIII.

TABLE VIII

| Brabender Torque Data of Styrene-Acrylic Acid (1% Acrylic Acid)/D.E.N.-431 | | | | | | | | | | |
|---|---|---|---|---|---|---|---|---|---|---|
| NaOH Concentration | D.E.N.-431 Concentration | Relative Torque (T/T$_4$ min) | | | | | | | | |
| | | 4 Minutes | 5 | 10 | 15 | 20 | 25 | 30 | 45 | 60 |
| 0 | 0 | 1 | 0.98 | 0.86 | 0.82 | 0.79 | 0.77 | 0.75 | 0.69 | 0.65 |
| 0.20 pph | 0 | 1 | 0.92 | 0.79 | 0.75 | 0.71 | 0.67 | 0.65 | 0.56 | 0.48 |
| 0 | 0.25 pph | 1 | 0.94 | 0.72 | 0.66 | 0.63 | 0.58 | 0.58 | 0.53 | 0.51 |
| 0.20 pph | 0.25 pph | 1 | 0.90 | 1.58 | 1.83 | 1.83 | 1.54 | 1.31 | 0.92 | 0.67 |

The significant relative torque development for the sodium hydroxide/D.E.N.-431 system is indicative of cross-linking with the styrene-acrylic acid copolymer.

The decrease in torque at long mixing times is probably associated with normal shear degradation.

F. Styrene-Acrylic Acid (1% Acrylic Acid)/D.E.R.-331

The previous experiment (E above) was repeated with the exception that 0.25 pph D.E.R.-331 (a Dow Epoxy Resin based on bisphenol-A having an epoxy equivalent weight of approximately 186) was used in place of the D.E.N.-431. Relative torque data are shown in Table IX.

EXAMPLE 4

Catalysts for the Styrene-Acrylic Acid Copolymer (1% Acrylic Acid)/D.E.N.-431 Reaction A styrene-acrylic acid copolymer containing one percent acrylic acid was added to the Brabender mixing head preheated to 225° C. and rotating at 20 rpm. Catalysts were added immediately and 0.25 pph D.E.N.-431 was added at five minutes. Relative torque data was recorded and is shown in Table X.

TABLE IX

Brabender Torque Data on Styrene-Acrylic Acid (1% Acrylic Acid)/D.E.R.-331

| NaOH Concentration | D.E.R.-331 Concentration | Relative Torque ($T/T_{4\ min}$) | | | | | | | |
|---|---|---|---|---|---|---|---|---|---|
| | | 4 Minutes | 5 | 10 | 15 | 20 | 25 | 30 | 45 | 60 |
| 0 | 0 | 1 | 0.98 | 0.86 | 0.82 | 0.79 | 0.77 | 0.75 | 0.69 | 0.65 |
| 0.20 pph | 0 | 1 | 0.92 | 0.79 | 0.75 | 0.71 | 0.67 | 0.65 | 0.56 | 0.48 |
| 0 | 0.25 pph | 1 | 0.96 | 0.78 | 0.73 | 0.68 | 0.62 | 0.57 | 0.51 | 0.51 |
| 0.20 pph | 0.25 pph | 1 | 0.92 | 1.12 | 1.92 | 2.12 | 1.88 | 1.55 | 1.08 | 0.86 |

TABLE X

Effect of Catalysts on the Reaction of Styrene-Acrylic Acid (1% Acrylic Acid/D.E.N.-431 (Brabender Relative Torque Data)

| Catalyst | D.E.N.-431 Concentration | Relative Torque ($T/T_{4\ min}$) | | | | | | | |
|---|---|---|---|---|---|---|---|---|---|
| | | 4 Minutes | 5 | 10 | 15 | 20 | 25 | 30 | 45 | 60 |
| 0 | 0 | 1 | 0.98 | 0.86 | 0.82 | 0.79 | 0.77 | 0.75 | 0.69 | 0.65 |
| 0 | 0.25 pph | 1 | 0.94 | 0.72 | 0.66 | 0.63 | 0.58 | 0.58 | 0.53 | 0.51 |
| 0.20 pph NaOH | 0.25 pph | 1 | 0.90 | 1.58 | 1.83 | 1.83 | 1.54 | 1.31 | 0.92 | 0.67 |
| 0.25 pph Ca(OH)$_2$ | 0.25 pph | 1 | 0.98 | 2.29 | 2.76 | 2.51 | 2.22 | 1.98 | 1.54 | 1.32 |
| 0.25 pph Mg(OH)$_2$ | 0.25 pph | 1 | 0.85 | 0.56 | 0.50 | 0.48 | 0.48 | 0.48 | 0.62 | 0.81 |
| 0.25 pph Zn(OH)$_2$ | 0.25 pph | 1 | 0.91 | 0.75 | 0.71 | 0.78 | 0.86 | 0.96 | 1.15 | 1.13 |
| 0.25 pph Al(OH)$_3$* | 0.25 pph | 1 | 0.85 | 0.57 | 0.49 | 0.47 | 0.43 | 0.42 | 0.38 | 0.36 |
| 0.25 pph KOH | 0.25 pph | 1 | 0.88 | 1.87 | 1.78 | 1.63 | 1.49 | 1.37 | 1.09 | 0.88 |
| 0.25 pph LiOH | 0.25 pph | 1 | 0.91 | 1.07 | 1.72 | 1.89 | 1.76 | 1.54 | 1.15 | 1.02 |
| 0.25 pph CaO | 0.25 pph | 1 | 0.74 | 0.50 | 0.54 | 0.76 | 0.95 | 0.93 | 0.68 | 0.55 |
| 0.25 pph MgO* | 0.25 pph | 1 | 0.94 | 0.81 | 0.74 | 0.73 | 0.71 | 0.69 | 0.64 | 0.59 |
| 0.25 pph ZnO* | 0.25 pph | 1 | 0.93 | 0.73 | 0.65 | 0.58 | 0.55 | 0.53 | 0.48 | 0.45 |
| 0.25 pph SiO$_2$/Na$_2$O (2/1) | 0.25 pph | 1 | 0.83 | 0.51 | 0.49 | 0.51 | 0.58 | 0.68 | 0.95 | 0.73 |
| 0.28 pph triethylenediamine | 0.25 pph | 1 | 0.99 | 1.31 | 1.27 | 1.20 | 1.17 | 1.13 | 1.08 | 1.06 |
| 0.25 pph triphenylamine* | 0.25 pph | 1 | 0.83 | 0.63 | 0.56 | 0.54 | 0.52 | 0.50 | 0.42 | 0.35 |
| 0.50 pph tribenzylamine* | 0.25 pph | 1 | 0.82 | 0.50 | 0.45 | 0.43 | 0.42 | 0.40 | 0.37 | 0.35 |
| 0.25 pph sodium methoxide | 0.25 pph | 1 | 0.80 | 0.53 | 0.68 | 0.87 | 0.92 | 0.84 | 0.58 | 0.47 |
| 0.25 pph potassium T-butoxide | 0.25 pph | 1 | 0.86 | 1.50 | 1.56 | 1.41 | 1.27 | 1.14 | 0.88 | 0.72 |
| 0.25 pph calcium acetate* | 0.25 pph | 1 | 0.97 | 0.83 | 0.81 | 0.75 | 0.72 | 0.72 | 0.64 | 0.64 |
| 0.25 pph nickel acetate* | 0.25 pph | 1 | 0.90 | 0.67 | 0.64 | 0.62 | 0.58 | 0.56 | 0.50 | 0.48 |
| 0.25 pph zinc acetate | 0.25 pph | 1 | 0.92 | 0.77 | 0.77 | 0.81 | 0.88 | 0.96 | 1.21 | 1.23 |
| 0.25 pph sodium acetate | 0.25 pph | 1 | 0.84 | 0.55 | 0.52 | 0.55 | 0.62 | 0.74 | 0.88 | 0.71 |
| 0.25 pph calcium stearate | 0.25 pph | 1 | 0.79 | 0.73 | 1.14 | 1.22 | 1.13 | 0.95 | 0.68 | 0.57 |
| 0.25 pph zinc stearate | 0.25 pph | 1 | 0.94 | 0.83 | 0.77 | 0.80 | 0.83 | 0.86 | 0.94 | 0.86 |
| 0.25 pph sodium stearate | 0.25 pph | 1 | 0.85 | 0.90 | 1.07 | 1.18 | 1.11 | 0.97 | 0.71 | 0.57 |
| 0.25 sodium bicarbonate | 0.25 pph | 1 | 0.85 | 0.56 | 0.55 | 0.66 | 0.89 | 1.06 | 0.85 | 0.70 |
| 0.25 sodium carbonate | 0.25 pph | 1 | 0.92 | 0.77 | 0.79 | 0.90 | 1.15 | 1.46 | 1.38 | 1.25 |
| 0.25 calcium carbonate* | 0.25 pph | 1 | 0.91 | 0.73 | 0.68 | 0.64 | 0.61 | 0.59 | 0.52 | 0.50 |
| 0.25 pph ferric chloride | 0.25 pph | 1 | 0.93 | 1.18 | 1.18 | 1.16 | 1.11 | 1.07 | 0.91 | 0.80 |

TABLE X-continued
Effect of Catalysts on the Reaction of Styrene-Acrylic Acid (1% Acrylic Acid/D.E.N.-431 (Brabender Relative Torque Data)

| Catalyst | D.E.N.-431 Concentration | Relative Torque (T/T₄ min) | | | | | | | |
|---|---|---|---|---|---|---|---|---|---|
| | | 4 Minutes | 5 | 10 | 15 | 20 | 25 | 30 | 45 | 60 |
| 0.25 pph chromic chloride* | 0.25 pph | 1 | 0.92 | 0.67 | 0.63 | 0.59 | 0.57 | 0.55 | 0.49 | 0.45 |
| 0.25 pph sodium chloride* | 0.25 pph | 1 | 0.93 | 0.52 | 0.45 | 0.39 | 0.38 | 0.34 | 0.30 | 0.28 |
| 0.25 pph 2-methyl-imidazole | 0.25 pph | 1 | 0.88 | 1.05 | 0.98 | 0.88 | 0.79 | 0.72 | 0.58 | 0.49 |
| 0.25 pph tetra-butyl phosphonium acetate | 0.25 pph | 1 | 0.82 | 1.51 | 1.34 | 1.21 | 1.10 | 1.00 | 0.80 | 0.69 |

*These additives showed no catalytic activity during these experiments with styrene-acrylic acid (1% acrylic acid) and D.E.N.-431.

Analogously good results are obtained when other acid-containing polymers and/or other cross-linking agents, as well as other possible catalysts and different nucleating agents, are employed (including variations of possible diverse ingredients with the systems above illustrated) in adaptations and embodiments of the present invention performed within the general metes and bounds above laid out for practice of the instant contribution to the art.

It is to be recognized that many modifications can be readily made in practice of the present invention without substantial departation from its apparent and intended spirit and scope as to embodimentation and practice thereof, which is all in pursuance and accordance with that which is set forth and delineated in the hereto-appended claims.

What is claimed is:

1. Method for the preparation of synthetic resinous thermoplastic products which comprises providing an acid-containing resinous polymer of an alkenyl aromatic monomer having copolymerized therewith at least about 60 percent by weight of at least one monomer of the Formula:

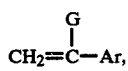

(I)

wherein G is selected from the group consisting of hydrogen and methyl and Ar is an aromatic radical, including various alkyl- and halo-ring-substituted aromatic units, of from 6 to about 10 carbon atoms; with acid-providing monomer that is copolymerizable with styrene of at least one other monomer of the Formula:

(II)

wherein Z is selected from the group consisting of hydrogen, alkyl radicals that contain not more than about 4 carbon atoms and carboxyl units when X is devoid of any carboxylating attachments; and X is a monoethylenically unsaturated substituent selected from the group consisting of methylene, alkenyl units containing from 2 to about 5 carbon atoms and, when Z is not carboxyl, carboxylated methylene and monocarboxylated alkenyl and alkene units containing from 2 to about 5 carbon atoms; the same having any further balance, if any, of copolymerized ethylenically unsaturated components, monomers and elastomeric natural or synthetic rubbers of at least one member of the class of same that are copolymerizable with styrene; feeding and passing through a mixing, malaxating extrusion apparatus acid-containing polymer, operating the extrusion apparatus at a temperature of between about that of the heat softening temperature of said polymer and that of the decomposition temperature of the polymer; and at one or more points within the apparatus at about or between its feed point and the point of extrudate discharge therefrom, incorporating into said polymer mass passing through said apparatus an effective interconnecting and network-building additament quantity of a cross-linking agent that is reactive with the free carboxyl entities in said polymer whereby to cross-link said mass of polymerizate material therein; and finally discharging said cross-linked mass of polymer material from said extruder apparatus.

2. The method of claim 1, wherein a blowing agent is admixed with the resinous polymer and the extrudate discharged from the extruder is converted directly into an extrusion molded product through appropriate forming means on the discharge end of said extruder apparatus.

3. The method of claim 2, including forming foamed board or sheet stock.

4. The method of claim 2, including forming foamed film goods.

5. The method of claim 1, wherein the extrudate discharged from the extruder is forced by injection into a mold form therefor to convert same directly into an injection molded article of manufacture.

6. The method of claim 1 and including adding along with said cross-linking agent an effective quantity of a catalyst for promoting the reaction of said cross-linking agent with the free carboxyl entities in said polymerizate.

7. In the method of claim 1, using between about 0.10 and about 10 milliequivalents of said cross-linking agent per each 100 equivalent parts by weight of said acid-containing, alkenyl aromatic polymer mass passing through said extruder apparatus.

8. In the method of claim 6, using between about 0.10 and about 10 milliequivalents of said cross-linking agent per each 100 equivalent parts by weight of said acid-containing, alkenyl aromatic polymer mass passing through said extruder apparatus.

9. The method of claim 1 and including adding along with said cross-linking agent an effective quantity of volatile blowing agent and a pulverulent nucleating agent to form an expandable polymer mass.

10. The method of claim 9, wherein the extrudate discharged is at the time thereof cooled to a temperature beneath its foaming temperature and thereafter converted directly into foamable strandular product adapted to be comminuted into expandable particles of said polymer mass.

11. In the method of claim 1, taking an acid-containing, alkenyl aromatic interpolymer that contains copolymerized therein between about 80 and about 99.9 weight percent of said Formula (I) monomer in the interpolymer molecule.

12. A method in accordance with claim 1 wherein said formula (I) monomer is styrene.

13. A method in accordance with claim 12, wherein said formula (II) monomer is acrylic acid.

14. A method in accordance with claim 1, wherein said acid-containing, alkenyl aromatic interpolymer is a copolymer of styrene and acrylic acid.

15. A method in accordance with claim 1, wherein said cross-linking agent is a polyisocyanate.

16. The method of claim 15, wherein said polyisocyanate is 4,4'-methylenediphenyldiisocyanate.

17. A method in accordance with claim 1, wherein said cross-linking agent is an epoxy resin.

18. A method in accordance with claim 1, wherein said cross-linking agent is a divinyl ether.

19. The method of claim 18, wherein said divinyl ether is diethylene glycol divinyl ether.

* * * * *